United States Patent
Zapart

[11] 3,887,202
[45] June 3, 1975

[54] SPEED GRIND FIXTURE
[76] Inventor: Bruno J. Zapart, P. O. Box 1217, Hot Springs, Ark. 71901
[22] Filed: Sept. 10, 1974
[21] Appl. No.: 504,482

Related U.S. Application Data
[63] Continuation-in-part of Ser. No. 306,178, Nov. 13, 1972, abandoned.

[52] U.S. Cl. ............... 279/5; 33/1 D; 33/174 TB; 33/174 TD; 51/216 H; 279/1 DC
[51] Int. Cl... B23q 17/04; B23b 31/36; B24b 41/06
[58] Field of Search........ 51/216 ND, 216 H; 279/5, 279/1 DC, 110, 48, 52; 33/1 D, 1 N, 174 TB, 174 TD

[56] References Cited
UNITED STATES PATENTS

| | | | |
|---|---|---|---|
| 2,351,246 | 6/1944 | Walling | 51/216 H |
| 2,383,619 | 8/1945 | Rosner | 51/229 |
| 2,520,518 | 8/1950 | Thompson | 279/5 |
| 2,811,365 | 10/1957 | Larson | 279/110 |
| 2,876,543 | 3/1959 | Dzaack | 33/1 D |

FOREIGN PATENTS OR APPLICATIONS

| | | | |
|---|---|---|---|
| 850,103 | 9/1952 | Germany | 33/1 D |

*Primary Examiner*—Al Lawrence Smith
*Assistant Examiner*—Marc R. Davidson
*Attorney, Agent, or Firm*—Ralph R. Pittman

[57] ABSTRACT

A grinding fixture has a rotatable workpiece-holding spindle which may be indexed at any selected angular division of a circle, utilizing at least two circumferentially spaced indexers radially insertable into and retractable from the interspaces between adjacent teeth spaced at ten degree intervals around the circumferential face of an associated rotatable spindle. The indexed angle is determined by the circumferential spacing of the indexers with respect to the interspaces. Either a collet, scroll chuck or V-block may be used to mount the workpiece on the fixture.

10 Claims, 8 Drawing Figures

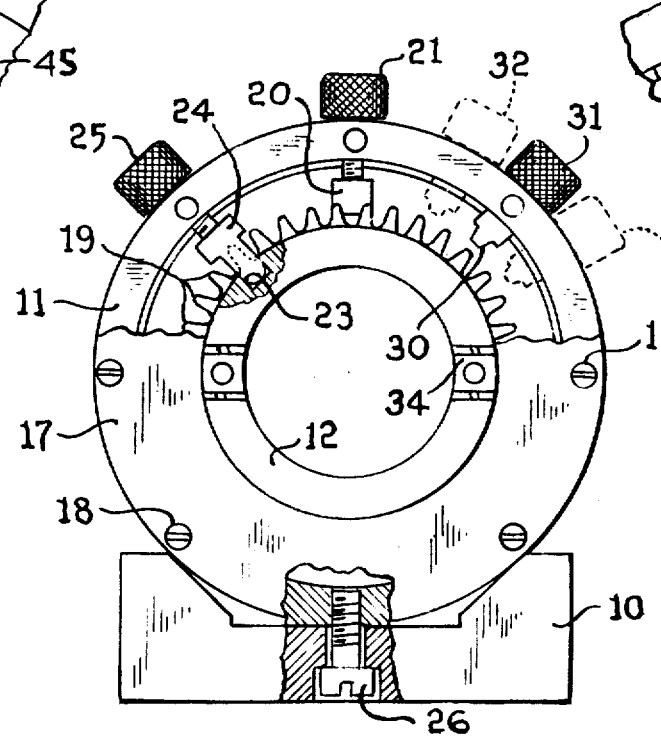

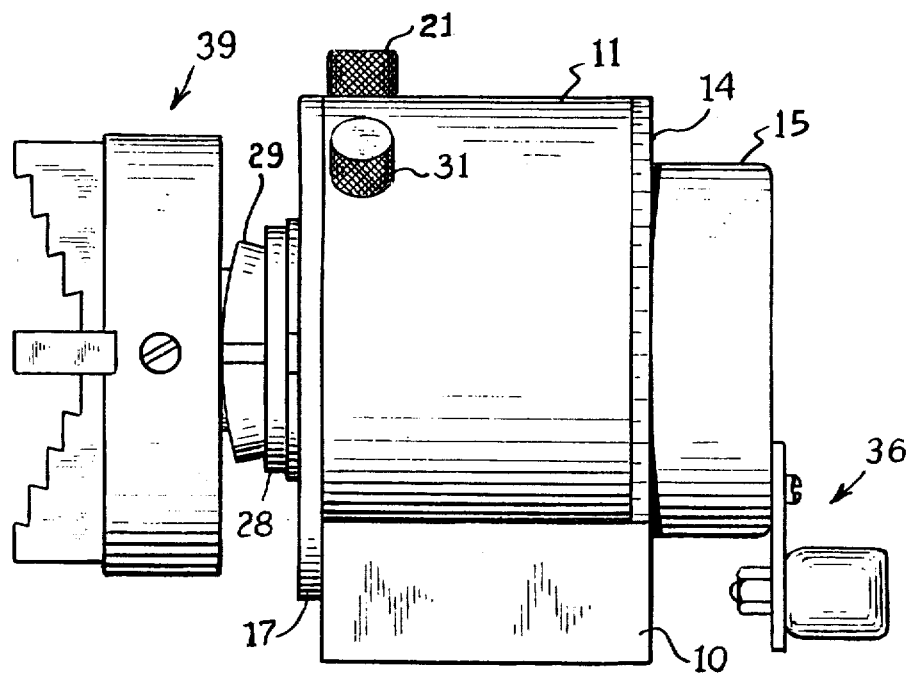
Fig. 6
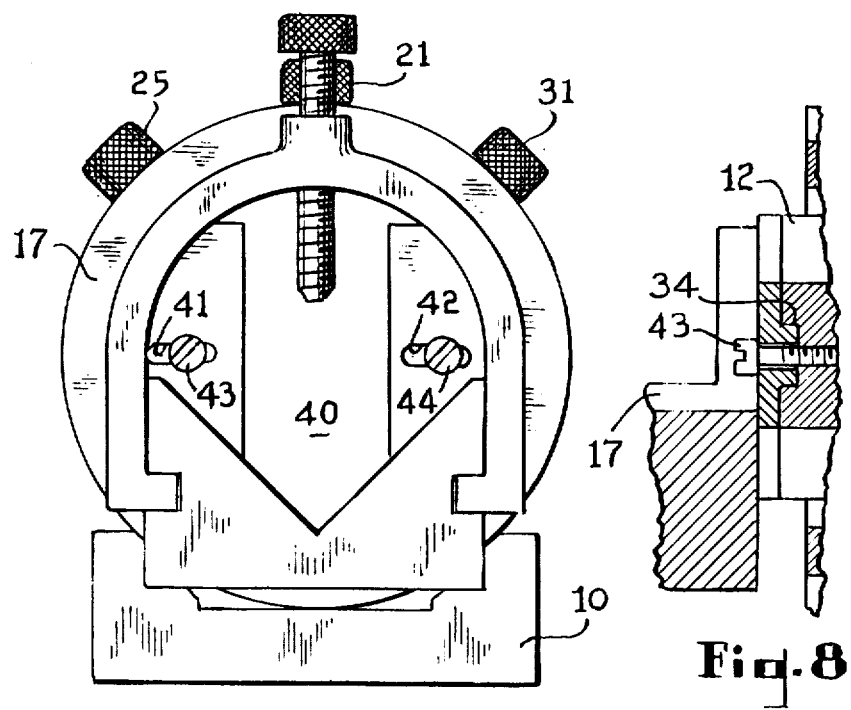
Fig. 7
Fig. 8

SPEED GRIND FIXTURE

BACKGROUND

This application is a continuation-in-part of applicant's copending application Ser. No. 306,178, filed Nov. 13, 1972 and now abandoned.

In the operation of workpiece holders such as collets, jaw chucks and V-blocks it is often necessary to successively index a workpiece along various angular intervals; e.g., when a workpiece requires a series of flats around its periphery.

Most of the indexing devices found in the prior art appear to be limited to constructions having a single bolt or pin as the indexing mechanism; a lesser number utilize various styles of multiple disk or wheel structures which necessarily require somewhat complex mechanisms, but are capable of indexing single digit angles. No simple structure appears in the prior art utilizing only a single indexing wheel which is capable of indexing small angles and fractions thereof.

The three most important time-consuming nonproductive operations during the use of grinding fixtures are (a) indexing the workpiece; (b) cleaning abrasive dust from the movably engaged surfaces of the fixture and (c) changing the clamping member in accordance with the size and shape of the workpiece. The most effective use of work time is attained when the time of these operations is the shortest possible.

SUMMARY OF THE INVENTION

The herein described indexing workpiece holder includes the well-known construction in which a stationary cylindrical housing contains a rotatably mounted spindle. The spindle is adapted to optionally receive either a workpiece-holding collet, chuck or V-block. An internally tapered circular collet-truing ring enables the adjustment of the collet to precise axial concentricity with respect to the rotary spindle.

A workpiece, depending upon its size and shape, may be fixed in either a collet in the spindle; between the jaws of a scroll chuck, the shaft of which is inserted and clamped in the collet; or, following removal of the collet from the spindle, in a sliding V-block clamp adapted for attachment to the forward end of the spindle.

The indexing mechanism includes a single row of equally angularly spaced, radially projecting teeth extending circumferentially around one end of the spindle, the radial center lines through the adjacent interspaces between each pair of adjacent teeth subtending equal angles at the axis of rotation of the spindle.

Projecting radially inward from circumferentially spaced locations along the exterior of the housing are at least two radially reciprocable teeth-engaging members, herein referred to as indexers. The angle subtended by the radial planes passing through the radial centerline of the indexers establishes the angle intervals which can be indexed by a spindle having a given number of teeth. If, for example, the number of teeth is 36, the interspaces on each side of any single tooth are at ten degree intervals, and the turning of the spindle from the position of engagement with a first indexer at one interspace to the engaged position with the next interspace results in a spindle movement through the 10° angle. If a second tooth-engaging member, or indexer, is positioned at an angular space of exactly 45° from the first tooth-engaging member, the rotary movement of the spindle through an angle of 5°, corresponding to one-half of the above-described 10° movement, will enable the second indexer to enter an adjacent interspace to index a 5° movement.

It is believed apparent from the above description that additional indexers having appropriately selected angular relationships with respect to a first indexer enables the provision of a large number of differing-interval indexing positions utilizing a plurality of indexers associated with only a single indexing wheel.

BRIEF DESCRIPTION OF THE DRAWING

FIG. 1 is a forward or front view of the fixture, an upper portion of the forward end closure being broken away to display the rotatable spindle indexing wheel, two angularly spaced indexers and a spindle lockpin shown locking the spindle against rotary movement. The broken lines indicate locations suitable for the addition of other indexers;

FIG. 2 is a side elevation, shown partly in section, of the fixture equipped with a collet and collet truing ring;

FIG. 3 is a fragmentary view of a rear portion of the housing of the fixture along with an upper portion of the rotatable rearward end closure, showing the index mark and angular graduation marks for externally indicating the internal angular position of the spindle;

FIG. 4 is a fragmentary plan view of a portion of the forward end closure, illustrating the guide slots along which the indexer spindle-engaging shoes move;

FIG. 5 is a fragmentary elevation view of the structure of FIG. 4, showing an indexer shoe in position in the associated guide slot;

FIG. 6 is a side elevational view, in which a collet is shown holding a four-jaw scroll chuck;

FIG. 7 is a forward end elevation of the fixture with a horizontally adjustable V-block mounted on the spindle; and FIG. 8 is a fragmentary view illustrating the structure utilized to secure the V-block to the spindle.

DESCRIPTION OF THE PREFERRED EMBODIMENT

Referring first to FIGS. 1 and 2 of the drawing, a hollow cylindrical housing 11 is mounted on a base 10 and rigidly fixed thereon by the fastener 26. A hollow cylindrical spindle 12, having an outside diameter less than the internal diameter of the housing, extends concentrically through the housing, a forward end portion of the spindle projecting forwardly beyond the forward end of the housing.

The spindle 12 is journaled for concentric rotation with respect to he housing 11 by the roller bearing 13, the bearing being interposed between the outer surface of the spindle and the inner surface of the housing. The annular rearward end closure 14 slidably engages the rearward end surface of the housing and is rigidly secured to the spindle 12 by the fastener 46.

An internally threaded manipulating ring 15 extends rearwardly from the rearward end closure 14 and radially over a rearwardly extending flanged portion of the closure, the fastener 46 having a radially directed end portion disposed in the guide channel 16. In this way, the manipulating ring 15 is attached loosely, or in floating relationship with the end closure 14, permitting a limited axial movement of the ring 15 for cooperating with the forward truing ring 28 to enable precise alignment of the collet 29 in the spindle as the manipulating ring is threadedly engaged with the collet 29 for clamping a workpiece therein. A hand crank 36, attached to the manipulating ring by the fastener 38, may be utilized for conveniently manipulatively rotating the manipulating ring.

The rearward annular end closure 14 is rigidly fixed on the spindle and rotatable therewith; the forward annular end closure 17 is not rotatable with the spindle, being rigidly held against the forward end of the housing 11 by the fasteners 18.

As shown in FIG. 1, a row of equally spaced, radially directed and outwardly tapered indexing spindle teeth 19 extend concentrically around an enlarged end portion of the spindle. The circumferential spacing of the indexing teeth, as drawn in FIG. 1, results in a 36-tooth structure, this number of teeth being the preferred construction.

A first indexer including the knob screw 21 in threaded engagement with the spindle-teeth-engaging shoe extends radially inward through the opening 22 (FIG. 2) of the housing 11 from the topmost point thereof and along a plane extending vertically upward from the axis of rotation of the spindle, the shoe 20 being shown after having moved radially into the interspace between the subjacent pair of adjacent teeth and engaging these teeth along the adjoining sloped surfaces. It is apparent that, if this first indexer is radially retracted and the spindle turned just sufficiently to permit the shoe to be moved into the next interspace, a ten degree movement of the spindle will have been indexed, and by repeating this procedure, any whole number multiple of the ten degree interval may be indexed.

A second indexer, similar in structure to the first, includes the knob screw 31 in threaded engagement with the shoe 30, and extends radially inward through the housing along a plane extending upwardly from the axis of rotation of the spindle and displaced from the radial plane defining the path of the first indexer by an angle of 45°, the number 45 being the product of the integer 10 and the mixed number 4½.

As may be seen in FIG. 1, the plane defining the radial path of movement of the second indexer passes through the center of the nearest spatially subjacent tooth; if the spindle is now turned to permit the shoe 30 to be moved radially into the closest adjacent interspace an angle of 5° will have been indexed. This 5° angular movement of the spindle positions another tooth directly below the shoe 20 of the first indexer, enabling a like movement thereof to index another 5° interval.

The above-described structure enables a workpiece held in the spindle to be indexed at any angle in degrees which is an integral multiple of five, and this is the preferred construction, suitable for most practical purposes. Other and smaller angular intervals may be indexed with additional correctly-positioned indexers. As examples, the indexer 32, shown in broken line, is positioned to move along a radial plane displaced 28° from the vertical, establishing a 2° indexing interval. Similarly, the indexer 33, positioned along a 59° radial plane, establishes a 1° indexing movement.

The torque incident to the clamping of a workpiece in the fixture may be such as to distort the spindle teeth or the indexers unless a supplementary spindle-locking structure is utilized. Such a spindle lock is shown in FIG. 1, the lockpin including the knob screw 25 in threaded engagement with the latch 24, the latter being shown in the spindle-locked position after having radially entered the inwardly extending recess 23 in the spindle. The latch 24 has a coplanar projection fitting into the recess 23, the latter being positioned forwardly from and spatially adjacent to the row of spindle teeth. Rotation of the knob screw withdraws the latch from the recess, and the preferred location of the lockpin on the housing is along an axial plane extending upward from the axis of rotation of the spindle at an angle of 45° in a counterclockwise direction viewed from the forward end of the fixture.

The indexer shoes 20 and 30 and the latch member 24 are bodies rectangular in section, and these rectangular portions are fitted for slidable movement along guide slots extending radially through an integral flange 45 projecting rearwardly from the inner side of the forward housing end closure, the flange 45 fitting into the inner end of the housing and having its innermost surface disposed adjacent to the row of spindle teeth.

The guide structure is shown in the fragmentary views FIGS. 4 and 5, in which the slot 27 is shown holding the shoe 20 for slidable guidance therealong, the slot extending radially through the inwardly directed flange 45 of the end closure 17.

The fragmentary view in FIG. 3 illustrates an upper portion of the rearward end of the housing 11 and an associated upper portion of the rotatable annular rearward end closure 14. The perimetrical surface of the end closure 14 has formed therealong a plurality of circumferentially spaced graduation marks 35, one of which is indicated by the numerical symbol 0; other marks indicate the angular departure from the zero symbol. To facilitate locking the spindle, the coincidence of the zero mark with the index mark 37 at the top of the housing indicates that the locking recess 23 in the spindle is aligned with the radial path of the lockpin and in position for locking. If desired, additional locking recesses may be formed in the spindle; however, only one is required for satisfactory operation of the fixture.

The versatility of the fixture is illustrated in FIGS. 6, 7 and 8. The four-jaw scroll chuck 39 appearing in FIG. 6 is simply secured to the spindle by inserting the shaft of the chuck in a collet held in the spindle, no adjustment being required with a previously aligned collet.

The attachment of an adjustable V-block 40 is shown in FIGS. 7 and 8. If a collet is in the spindle, it is removed, and the screw 47 moved to engage the spindle. The V-block is then secured to the forwardly projecting end of the spindle. A pair of diametrically opposed, rearwardly directed recesses 34 are formed in the endwall of the spindle, and a rearwardly directed, transversely extending rib along the back of the V-block base is fitted into the recesses. A pair of diametrically spaced, horizontally extending fastener-receiving slots 41 and 42 enable limited horizontal adjustment of the V-block along the fasteners 43 and 44. The V-block, being constructed to provide vertical adjustment, may be moved as necessary to effect a precise alignment of a workpiece in the V-block with the axis of rotation of the spindle.

The elapsed time requirement for changing the workpiece clamp associated with the fixture from collet to chuck is about 15 seconds and from collet to V-block about one minute. The dust-tight construction makes unnecessary any loss of working time for cleaning abrasive dust from the precision-fitted movable members of the fixture.

What is claimed is:

1. A workpiece holder comprising an outer cylindrical housing, a hollow open-ended generally cylindrical spindle extending concentrically within said housing and projecting forwardly therefrom, a forward annular closure rigidly secured to said housing, a rearward annular closure including a rearwardly extending concentrically disposed manipulating ring attached to said spindle, bearing means within said housing rotatably supporting said spindle, a row of 36 equally spaced radially directed and outwardly tapered spindle teeth extending concentrically around the spindle, the circumferential spacing between the inmost points between each pair of the interspaces at each side of each tooth subtending an angle of ten degrees at the axis of rotation of the spindle, a plurality of circumferentially spaced, radially movable spindle-engaging indexers mounted along the exterior of said housing, said indexers projecting radially inward through the wall of the housing to removable engagement with selected pairs of adjacent teeth along the adjoining tapered surfaces of the teeth for precluding rotary movement of the spindle, said indexers including at least a first and a second indexer spaced respectively for movement along radial planes subtending an angle in degrees at the axis of the spindle which is the product of the number ten and a mixed number, and clamping means effective to removably secure a workpiece to the revoluble spindle.

2. The workpiece holder in accordance with claim 1, wherein the paths of movement of the first and the second indexers are respectively along angularly spaced planes extending upwardly from the axis of rotation of said spindle, the plane defining the path of the second indexer being angularly displaced from the plane defining the path of the first indexer by an angle of 45°.

3. The subject matter of claim 2, wherein the movement of the first indexer is along a path defined by a vertical plane extending upwardly from the axis of rotation of the spindle.

4. The workpiece holder defined in claim 1, including supplemental locking means effective to preclude rotary movement of the spindle with respect to the housing, said locking means comprising at least one inwardly extending recess in said spindle spatially adjacent to said row of spindle teeth, a lockpin mounted on the exterior of said housing and projecting radially inward through the wall of the housing, said lockpin being reciprocably movable into and out of said recess, and external indicating means effective to index the angular position of said spindle at which said recess registers with said lockpin.

5. The workpiece holder as set forth in claim 4, wherein the angular locking position of the spindle is along an axial plane extending upwardly from the axis of rotation of the spindle at an angle of 45°.

6. The workpiece holder according to claim 1, in which an integral flange projects from the inner and rearward side of the annular forward end closure, said flange extending into said housing in slip-fit engagement therewith, the innermost surface of the flange being disposed adjacent to said row of spindle teeth, guide slots rectangular in section extending radially through said flange in the direction of movement of said indexers, and teeth-engaging shoes rectangular in section slidably fitted into said slots for guided reciprocable movement therealong.

7. The workpiece holder as claimed in claim 1, wherein the topmost point of the rearward end portion of said housing is indicated by means of an index mark, and the perimetrical surface of said rearward end closure has formed therealong a plurality of graduation marks selectively coextensive with said index mark.

8. A workpiece holder as defined in claim 1, wherein the internal diameter of said rearwardly extending manipulating ring is less than the internal diameter of said spindle and a collet passing axially through said spindle threadedly engages said ring, said collet extending forwardly from said ring beyond the forward end of said spindle, and truing means for aligning the collet coaxially with the axis of rotation of said spindle concurrently with the tightening of the manipulating ring to effect clamping movement of said collet.

9. The workpiece holder as claimed in claim 8, wherein a scroll chuck having a concentric rearwardly projecting shaft is mounted for rotation on the spindle, said shaft extending into the collet in clamping relationship therewith.

10. The workpiece holder as set forth in claim 1, in which a V-block having an upstanding mounting base is secured to the forwardly-projecting portion of the spindle, said portion having formed therein a pair of diametrically opposed rearwardly extending recesses across the wall of the spindle projection, said V-block mounting base having a rearwardly directed, transversely extending rib fitted into said recesses, a pair of diametrically spaced fastener-receiving slots respectively in registration with said recesses, and means effective to rigidly secure the base of the V-block to the spindle, said means including a fastener extending rearwardly through each of said slots and threadedly entering the wall of the spindle through the forward end surface thereof.

* * * * *